Sept. 14, 1926.  1,599,676
J. F. O'CONNOR
FRICTION SHOCK ABSORBING MECHANISM
Filed August 23, 1923   2 Sheets-Sheet 2
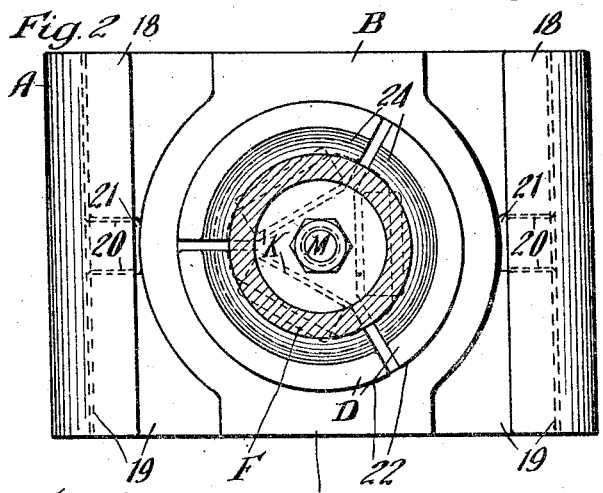
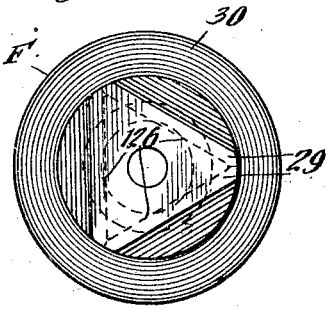
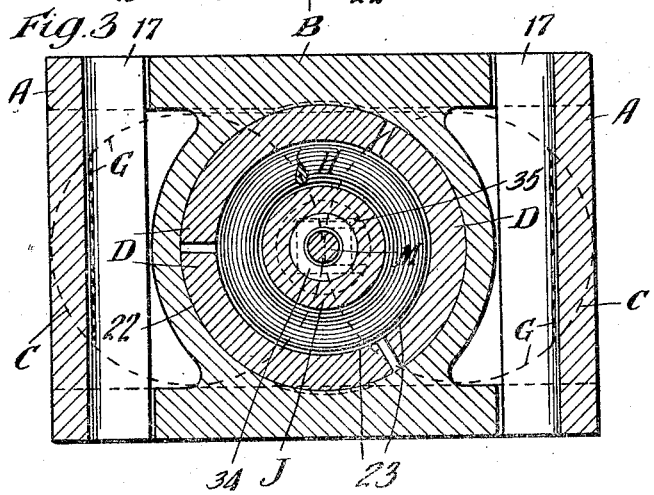
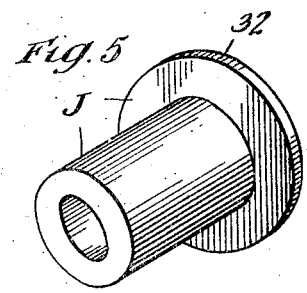
Witnesses
Wm. Geiger
Inventor
John F. O'Connor
By George I. Haight
His Atty.

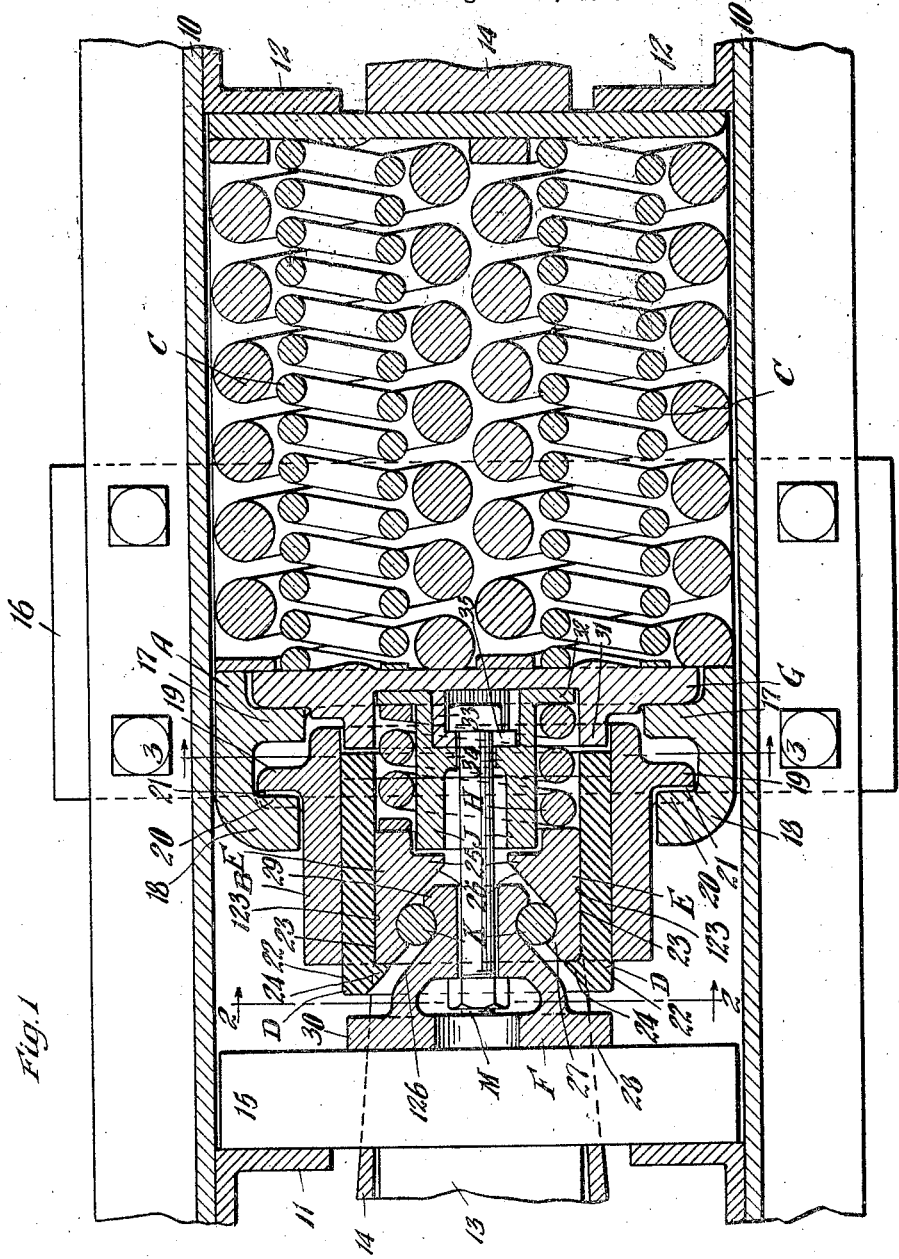

Patented Sept. 14, 1926.

1,599,676

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed August 23, 1923. Serial No. 658,875.

This invention relates to improvements in friction shock absorbing mechanisms.

One object of the invention is to provide a high capacity friction shock absorbing mechanism having a preliminary spring action.

Another object of the invention is to provide a friction shock absorbing mechanism having a preliminary spring action and a graduated frictional resistance of increasing capacity.

Another and more specific object of the invention is to provide a friction shock absorbing mechanism employing a shell and a plurality of co-operable friction elements, the arrangement being such that there is an initial movement, in unison, of the shell and elements to absorb the lighter shocks, a subsequent limited relative movement of the friction elements with reference to each other to absorb somewhat heavier shocks, and a final relative movement of the friction elements and the shell to absorb the extremely heavy shocks.

In the drawings forming a part of this specification, Figure 1 is a longitudinal, horizontal, sectional view of a portion of a railway draft rigging showing my improvements in connection therewith, the section through the shell and friction elements therewithin corresponding to two section planes at approximately 120° apart. Figures 2 and 3 are vertical, transverse, sectional views corresponding substantially to the lines 2—2 and 3—3 respectively, of Figure 1. Figure 4 is a detailed, rear end, elevational view of the wedge. And Figure 5 is a detailed, perspective view of an abutment sleeve used in connection with my improvements.

In said drawings 10—10 denote the usual channel shaped or center sills of a car underframe, to the inner faces of which are secured front stop lugs 11 and rear stop lugs 12 of usual construction. A portion of the drawbar is indicated at 13, the same having operatively associated therewith a hooded cast yoke 14 of well known form, and within which is disposed the shock absorbing mechanism proper, hereinafter described, and a front main follower 15. The yoke and parts contained therein are supported in operative position by a detachable saddle plate 16.

The improved shock absorbing mechanism proper, as shown, comprises, broadly, a spring casing A; a friction shell B; twin main springs C—C; three outer friction shoes D—D—D; three inner friction wedge shoes E—E—E; a wedge F; a spring follower G; an auxiliary spring H; an abutment sleeve J; a plurality of anti-friction rollers K; and a retainer bolt M.

The spring casing A is of generally rectangular formation with the sides thereof open so as to permit the lateral insertion of the main springs C—C after the spring follower F is in place. The rear wall of the casing co-acts with the stop lugs 12 in the manner of a rear follower. At its forward end, the casing A is provided on opposite sides thereof with vertically extending, opposed ribs 17—17 and opposed flanges 18—18, as most clearly shown in Figure 1, thereby presenting opposed shoulders at each side of the casing.

The friction shell B, as shown, is of generally cylindrical form and is provided at its rear end with opposite flanges as indicated at 19. The arrangement is such that the flanges 19 are insertable in a vertical direction between the ribs 17 and the flanges 18 of the casing A and the spacing of the ribs 17 and flanges 18 is so designed as to permit a predetermined amount of lost motion between the shell and casing.

To retain the shell B and the casing A in assembled relation in the normal position of the parts, the flanges 18 are provided with rearwardly projecting lugs 20 co-acting with recesses 21 on the front faces of the flanges 19 of the shell B.

The three friction shoes D, preferably in the form of castings, are of like construction, each having an elongated outer cylindrical friction surface 22 co-acting with the inner surface of the shell B and an inner, elongated, cylindrical friction surface 23 adapted to co-act with one of the auxiliary friction shoes E. The shoes D are preferably equal in length to the shell B thereby presenting interior friction surfaces of considerable length to permit full movement of the auxiliary shoes. At the front end, each shoe D is provided with an interior shoulder 24 adapted to engage the outer end of the corresponding friction wedge shoe E and limit the outward movement thereof.

The friction wedge shoes E are of like construction, each having an outer cylindrical surface 123 adapted to slide on the friction surface 23 of the corresponding shoe D. On the inner side, that is the side nearest the axis of the shell, each shoe E is provided with a lateral enlargement 25 on the front side of which is provided a rearwardly and inwardly inclined flat face 26 having a shoulder 27 at the forward end thereof adapted to form a seat for one of the rollers K. As clearly shown in Fig. 1, the shoes E are considerably shorter than the shoes D and are adapted to have sliding movement thereon longitudinally of the mechanism.

The wedge F, through which the pressure is transmitted, is in the form of a hollow casting having a front, transverse bearing face 28 engaging the front follower 15. At its inner end, said wedge F is provided with three rearwardly and inwardly converging faces 126 disposed symmetrically around the center or axis of the wedge. Each of the faces 126 is correspondingly inclined to, and is adapted to co-operate with, the face 26 of the corresponding wedge friction shoe E, and a stop shoulder 29 is provided adjacent the inner end of each of said faces 126 to form a seat for the roller K interposed between each set of faces 26 and 126. At the outer end the wedge F is provided with an annular, laterally projecting flange 30 overhanging the shoes D and adapted to engage the same after a predetermined relative movement of the wedge friction shoes E on the friction shoes D.

The follower G is of generally rectangular outline and has the opposite ends thereof normally abutting the rear faces of the ribs 17 of the shell, being yieldingly held in that position by the springs C—C abutting the rear face thereof. At its front side, the follower G is provided with a forwardly extending annular flange 31 which extends through the opening between the ribs 17 and normally into the rear end of the shell B. In this manner the annular flange 31 of the follower G also serves to prevent accidental displacement of the shell B relatively to the casing A after the parts have been assembled. In the drawing a little clearance is shown between the annular flange 31 and the rear ends of the friction shoes D. This slight amount of clearance is designed primarily to compensate for errors in detail, and permit of exact adjustment by bolt M.

The sleeve J is in the form of a hollow cylinder having a laterally extending annular flange 32 at the rear end thereof. The sleeve J is seated within the annular flange 31 of the follower G, with the flange 32 thereof abutting the front face of the follower, and is telescoped over a hollow cylindrical boss 33 forwardly extending from, and formed integral with, the follower F.

The sleeve is also provided with an integral, interior annular shoulder 34 adapted to abut the front face of the boss 33. As shown in the drawings, slight clearance is also left between the outer end of the sleeve J and the projections 25 on the shoes E, the same being primarily for compensating for any error in detail of the parts. This clearance will be taken up immediately after compression of the mechanism before the gear proper actually comes into operation.

The spring H is interposed between the flange 32 of the sleeve J and the inner ends of the shoes E and serves to maintain the friction elements in proper tight contact.

The retainer bolt M is anchored at its rear end within the boss 33 and at its forward end within a suitable recess provided within the wedge B, the latter and the sleeve J being suitably apertured to accommodate the shank of the bolt. The boss 33 is provided at one side with a suitable recess 35 through which the head of the bolt M may be entered when assembling the parts. The retainer bolt M not only serves to maintain the parts in assembled relation but holds the spring H under initial compression and may be utilized to adjust the parts to proper over all length and maintain them in this position in full release, even after wear has taken place.

Assuming a buffing or compressing action applied to the mechanism, the operation is as follows. As the wedge F is forced inwardly, the initial action will be a wedging action between the same and the shoes E, thus also placing the shoes D under lateral pressure and pressing the same laterally outwardly against the shell B. The slight amount of clearance between the shoes E and the sleeve J and between the shoes D and the annular flange of the follower G will be taken up immediately upon compression of the gear before the gear proper actually comes into operation. The friction created between the shoes E and D, and between the shoes D and the shell B will cause the shell to move rearwardly with the wedge F and shoes, thereby causing the friction shell B, shoes E and D, wedge F and spring follower G to travel inwardly bodily as a unit, without actuating any of the friction elements relatively. This movement of the shell and associated elements is resisted by the main springs C—C, so that a true, preliminary spring action is obtained. This preliminary spring action continues until the friction shell engages the front faces of the ribs 17 of the casing A, and is arrested in its travel, whereupon the friction shoes E will be moved inwardly relatively to the shoes D and thus create a frictional resistance in addition to the resistance due to the action of the springs C—C. Due to this relative movement, the outer ends of the shoes E will be moved away from the shoulders 24 of the shoes D and the follower G will also be moved away from the inner ends of the latter. The shoes D will not be moved inwardly relatively to the shell at this time, inasmuch as greater frictional resistance is provided between the coacting faces of the shell and shoes D than between the contacting portions of the faces of the shoes E and D. This difference in frictional resistance may be obtained in various well-known ways, for example, by forming the shell of a material different from the shoes D and E, or by making the friction surfaces of the shoes D and E denser than the friction surfaces of the shell. This relative movement of the shoes E and D continues during the inward movement of the parts until the flange 30 on the wedge F engages the outer ends of the shoes D, whereupon, the latter will be moved inwardly of the shell B directly by the wedge moving in unison with the shoes E, thus offering increased friction resistance. This movement will continue until the follower 15 engages the outer end of the shell B.

Upon removal of the actuating or compressing force, the releasing action will be substantially instantaneous, due to the anti-friction rollers interposed between the faces of the wedge F and the shoes E, thereby reducing the pressure between the shell and the shoes D and E and permitting the springs C—C and H to restore the parts to normal position. During the restoration of the parts to normal position, outward movement of the shell B will be limited by engagement of the flanges thereof with the flanges 18 of the casing A, whereupon the shoes D and E will be moved outwardly of the shell by the follower G until the latter is arrested in its movement by engagement with the ribs 17 of the casing A. During the releasing action, the spring H will force the shoes E outwardly relatively to the follower G, the shoes E in turn forcing the wedge F outwardly until arrested by the retainer bolt M. In their outward movement the shoes E, by engagement with the shoulders 24, will also return the shoes D to their normal position.

With the arrangement above described, it is evident that an easy, graduated action is obtained with an ultimate high capacity, and at the same time the friction shell may be readily renewed and the cost of repairs thus minimized.

I have herein shown and described what I now consider the preferred manner of carrying out the invention, but the same is merely illustrative, and I contemplate all changes and modifications that come within the scope of the claims appended hereto.

I claim:—

1. In a friction shock absorbing mechanism, the combination with a friction shell having friction surfaces; of a plurality of relatively movable friction elements, said friction elements having co-operating friction surfaces and certain of said elements having friction surfaces co-operating with said shell surfaces, said co-operating surfaces of the shell and the elements in engagement therewith offering greater frictional resistance to relative movement than the co-operating surfaces of said elements; of a spring casing; spring means within said casing and co-operable with said friction elements, said shell and casing having a predetermined amount of lost motion therebetween, said shell and elements being movable bodily as a unit relatively to the casing to effect preliminary compression of said spring means to the extent of said lost motion; and wedge means for placing said friction elements under lateral pressure and forcing all of said friction elements inwardly of the mechanism.

2. In a friction shock absorbing mechanism, the combination with a friction shell having interior friction surfaces; of a spring casing, said shell and casing having a limited amount of relative movement; a plurality of friction elements within said shell having friction surfaces co-operable with said shell surfaces; additional friction elements relatively movable to said first named elements and having frictional engagement therewith, the frictional resistance between said elements being less than the frictional resistance between the shell and elements co-operating therewith; movable lateral pressure transmitting means co-operating with said friction elements; a spring resistance within said casing and co-operable with all of said friction elements, said shell and elements being movable bodily as a unit relatively to the casing to effect preliminary compression of said spring means; and follower means engaging said pressure transmitting means for forcing the same inwardly of the mechanism.

3. In a friction shock absorbing mechanism, the combination with a friction shell and a spring casing having a predetermined amount of lost motion therebetween; of a plurality of relatively movable friction elements within the shell, certain of said elements having frictional engagement with the shell and frictional engagement with the remaining elements, all of said elements being movable in unison with the shell during relative movement of the shell and casing; means for limiting the relative movement of said elements co-operating with the shell and the remaining elements; and spring means for resisting said relative movement of the shell and casing, to the extent of the lost motion and thereafter resisting the relative movement of said elements co-operating with the shell and the remaining elements and the relative movement of the shell and the elements co-operating therewith, as the compressive action progresses.

4. In a friction shock absorbing mechanism, the combination with a spring casing; of a friction shell, said shell and casing having limited relative movement; of a follower, said shell and follower having movement toward and away from each other; a plurality of inter-engaging, relatively movable, friction elements within said shell, certain of which have sliding frictional engagement with the shell; a spring resistance within said casing opposing inward movement of said elements; and a wedge pressure transmitting device engaged by said follower and having wedging engagement with the remaining elements, said wedge pressure transmitting device having means thereon for limiting relative movement of said remaining elements and the elements co-operating with the shell and for positively moving said last named elements relatively to the casing.

5. In a friction shock absorbing mechanism, the combination with a casing; of a spring resistance; a friction shell having limited movement longitudinally of said casing; a plurality of friction shoes slidably co-acting with said shell; a plurality of wedge shoes having limited sliding movement on said friction shoes; and wedge pressure transmitting means adapted to move said shell relatively to said casing, said wedge shoes relatively to said friction shoes, and said friction shoes relatively to said shell, in sequence, in the order named, during a compression stroke.

6. In a friction shock absorbing mechanism, the combination with a casing; of a spring resistance; a friction shell having limited movement longitudinally of said casing; a plurality of friction shoes slidably co-acting with said casing; a plurality of wedge shoes having sliding movement on said friction shoes; wedge means co-acting with said wedge shoes; a spring follower having abutment means thereon adapted to co-act with said wedge shoes; and yielding means interposed between said wedge shoes and follower.

7. In a friction shock absorbing mechanism, the combination with a spring casing open at one end thereof; of a friction shell disposed at said open end of the casing; co-operating shoulders on said shell and casing adapting the shell for a limited amount of relative movement with respect to the casing; co-acting inter-engaging lugs and recesses on said casing and shell to prevent accidental separation thereof; friction elements co-operable with said shell; spring means disposed within said casing; and a follower at the end of said spring means adjacent the shell and co-acting with said friction elements.

8. In a friction shock absorbing mechanism, the combination with a spring casing open at its sides and at one end; of spring means within said casing and adapted to be inserted through the open sides thereof; a friction shell, said shell and casing having co-operable shoulders permitting a predetermined relative movement between the shell and casing; relatively movable friction elements co-operating with the shell; and a spring follower within the casing and having means thereon engaging the interior of the shell to prevent accidental separation of the casing and the shell, said follower being adapted to co-act with said elements, the friction elements, shell and said follower moving bodily as a unit relatively to the casing and compressing the spring means for a predetermined amount, the friction elements being thereafter movable relatively to each other for a limited distance, and finally bodily movable in unison relatively to said shell and resisted by said spring means.

9. In a friction shock absorbing mechanism, the combination with a main follower; of a spring cage, said cage and follower being relatively movable toward and away from each other; a spring resistance; a friction shell, said shell and cage having limited relative movement; outer friction elements co-operable with the shell; inner friction elements co-operable with said outer friction elements; and pressure transmitting wedging means engaged by said main follower and having wedging engagement with said inner friction elements, the frictional resistance between the shell and outer friction elements being greater than the frictional resistance between said inner and outer elements whereby movement of said inner elements with reference to said outer elements is effected before relative movement of said shell and outer elements and after relative movement of the shell and cage to said limited extent.

10. In a friction shock absorbing mechanism, the combination with a spring cage having opposed recesses extending transversely through the cage at the open end thereof; of a friction shell having oppositely disposed laterally extending flanges of lesser thickness than the width of said recess, the shell being adapted to be assembled with the cage by moving the flanges of the shell transversely of the cage and within said recesses; means yieldable under pressure, normally holding said shell in its outermost position with respect to the cage; and registering shoulders and depressions on opposed faces of said flanges and the recesses of the cage whereby relative transverse movement between said shell and the cage is prevented while the shell is in its outermost position with respect to the cage.

11. In a friction shock absorbing mechanism, the combination with a spring casing open at one end thereof; of a shell disposed at said open end of the casing; co-operating means on said shell and casing for limiting the relative movement thereof longitudinally of the mechanism; and co-acting means on said casing and shell inter-engaging to prevent accidental separation thereof in a lateral direction when said shell is forced outwardly with reference to said cage; friction elements co-operable with said shell; spring means disposed within said casing; and a follower at the end of said spring means adjacent the shell co-acting with said friction elements.

In witness that I claim the foregoing I have hereunto subscribed my name this 21st day of August 1923.

JOHN F. O'CONNOR.